United States Patent Office 3,269,936
Patented August 30, 1966

3,269,936
HYDROCRACKING OF HYDROCARBONS WITH THE USE OF A NICKEL-TUNGSTEN SULFIDE CATALYST ON A SILICEOUS CARRIER ACTIVATED WITH A HALOGEN
Richard G. Goldthwait, Penn Hills Township, Allegheny County, and Stanley J. Kwolek, New Kensington, Pa., and Theodore Rice, Beaumont, Tex., assignors to Gulf Research & Development Company, Pittsburgh, Pa., a corporation of Delaware
No Drawing. Filed Sept. 25, 1962, Ser. No. 226,148
9 Claims. (Cl. 208—111)

This invention has for its object to provide improved procedure for the hydrocracking of distillate hydrocarbons.

Hydrocracking of distillate hydrocarbons in certain respects is a relatively expensive operation. In order to improve the economy of the process, one of the main requirements is to use a highly active catalyst which will retain high activity over a long period of time. While highly active catalysts have been employed, there is still room for improvement in controlling catalysts and the reaction conditions under which they are employed.

This invention has for its object to provide improved hydrocracking procedure. Another object is to provide improved hydrocracking procedure wherein a catalyst containing nickel-tungsten is employed. A still further object is to provide an improved procedure for hydrocracking distillate stocks whereby the hydrocracking process can be carried out over longer periods of time at high conversion rates. Other objects will appear hereinafter.

These and other objects are accomplished by out invention which includes subjecting a distillate feed stock composed primarily of hydrocarbons boiling in the range between about 350 and 800° F. to treatment with hydrogen in the presence of a nickel-tungsten sulfide, halide containing catalyst composited with a siliceous carrier having a cracking activity index of at least 40. (See J. Alexander et al., "Laboratory Method for Determining the Activity of Cracking Catalysts," National Petroleum News, vol. 36 1944, page R-537.) This treatment takes place at a pressure above about 400 p.s.i. at a temperature between about 400 and 800° F. During this treatment sulfur and/or a halogen may be added.

The catalyst utilized in our process may contain between about 5 and 40 percent and preferably 10 to 25 percent of nickel plus tungsten (determined as metals). The atomic ratio may be between 1 atom of tungsten to 0.1 atom of nickel to 1 atom of tungsten to 5 atoms of nickel. We prefer a range of between 1 atom of tungsten to 0.3 atoms to 4 atoms of nickel. Any siliceous carrier may be employed which has an activity index of at least 40. We preferably employ a siliceous carrier which has an activity index above 45. Such siliceous carriers are known in the catalytic cracking art, a typical example being silica-alumina cracking catalysts. Such catalysts may contain varying amounts of alumina and silica and also may contain other metal oxide components such as zirconia, thoria, magnesia, etc. Any of such mixtures may be employed as long as the carrier displays the characteristics of an active silica-alumina cracking catalyst. Especially useful materials are the so-called high alumina synthetic silica-alumina cracking catalysts containing 25 percent alumina such as "Triple A" silica-alumina or the equivalent catalyst in the pelleted form. These carriers are most advantageous when they are characterized by a surface area of 450 square meters per gram or greater and preferably 500 square meters per gram or greater.

The catalyst employed in our invention may be prepared using any known procedure for manufacture of such multi-component catalysts. Thus the nickel and tungsten components may be deposited upon the cracking carrier by co-precipitation. Alternatively they may be deposited in sequence with or without intervening calcining. Simultaneous impregnation from a two-component solution containing the two metals may also be employed. Thus the procedure described in McKinley et al. Patent 2,703,789 would be entirely satisfactory. The catalyst is always employed in a substantially sulfided condition.

If desired, the catalyst may be presulfided using any conventional sulfiding procedure. However, we prefer to utilize an unpresulfided catalyst and sulfide during use. We particularly prefer to utilize the start-up procedure described in cofiled application No. 226,090, in the names of Robert E. Kline and Joseph B. McKinley, now U.S. Patent No. 3,213,012.

We prefer to add sulfur during the onstream reaction with a presulfided or unpresulfided catalyst. Thus addition of sulfur permits the hydrocracking of higher nitrogen content feeds at lower pressures than would be otherwise possible. When using this expedient, elemental sulfur or any suitable sulfur compound may be added during the reaction to the fresh feed, recycle feed, make-up hydrogen and/or the recycle hydrogen rich gas stream. When speaking of added sulfur we intend to include the relatively small amount usually present in the normally hydrogen refined or other feed and the relatively large amount which builds up in any hydrogen-rich recycle gas stream when employing sulfur addition. Normally there is no sulfur in the liquid recycle but if any is present it is also included. Of course the operation may be single-pass, in which case only sulfur added to and in the fresh feed and the process gas comes into consideration. Any organic or inorganic sulfur compound especially those having a hydrogen-to-sulfur or a carbon-to-sulfur linkage as well as elemental sulfur can be used such as butyl mercaptan, thiophene, hydrogen sulfide, carbon disulfide, etc. It is preferable, where an unpresulfided catalyst is used, to avoid slow sulfiding, such as occurs when processing a normally hydrogen pretreated feed, and obtain rapid initial sulfiding by using large amounts of sulfur (to be hereinafter understood as designating elemental sulfur as well as the sulfur compounds mentioned above) during the early stages and then reduce the amount of sulfur to that which will maintain the catalyst in substantially sulfided condition in the later stages. Thus it is advantageous to add 0.1 to 2.0 percent sulfur (determined as elemental sulfur when a sulfur compound is used) based on total liquid hydrocarbon feed during early stages of the onstream cycle and reduce the sulfur to between about 40 p.p.m. and 1.5 percent later on and especially during the 55 to 80 percent conversion period. ("Conversion" means the actual percent conversion of feed to material boiling below the initial boiling point of feed where the feed includes unconverted feed recycle in recycle operation.) Sulfur contents in the feed, hydrogen, etc. based on total liquid hydrocarbon feed may vary from about 40 p.p.m. to 2.0 percent. Larger amounts of sulfur than 2.0 percent can of course be used, but there does not appear to be any economic advantage in using them. Straight-run feeds usually require less than about 1000 p.p.m. of sulfur during the conversion period. Aromatic feeds require larger amounts of sulfur than straight-run feeds. In contrast to the amount of sulfur we use, normally hydrogen refined feeds contain relatively small amounts if any sulfur.

Complete theoretical catalyst sulfiding usually does not take place. For instance, even with the addition of large amounts of excess sulfur or after strongly presulfiding, the catalyst in many cases is sulfided only to about 65 percent of theoretical. Such catalysts are understood to be within the scope of our invention. Although we refer to sulfides, sulfiding, etc., this is not to be taken to necessarily indicate the chemical form in which the hydrogenating components are present. Thus in accordance with our invention the hydrogenating components may be present as mixtures of the sulfides and/or in the form of chemical combinations such as nickel thio tungstate.

While the expedient of adding halogen during the reaction need not be used, it is preferable for longer onstream periods to add a halogen and preferably fluorine (for example, by means of suitable fluorine compounds such as difluoroethane, ortho-fluorotoluene, hydrogen fluoride, fluorine, etc.) during the reaction. If this expedient is not used, the catalysts must initially contain combined halogen with fluorine being the preferred component. When halogen addition is employed, the initial catalyst may be free of combined halogen although it is preferable that it contain combined halogen. The halogen may be combined with the catalyst during preparation by means of a compound such as HF; $NH_4F$; $NH_4F \cdot HF$, $H_2SiF_6$ or $HBF_4$, or corresponding or similar compounds of chlorine or bromine, such as hydrochloric acid, etc. About 0.1 to 5 percent halogen may be combined with the catalyst as the result of prior addition or addition during the onstream period. We prefer to use a catalyst containing between 0.5 and 3.5 percent combined halogen and especially between 1.5 and 2.5. When adding halogen during the onstream period, it has been found desirable for economic reasons to limit the addition rate to an amount less than 20 p.p.m. halogen or halogen compound, calculated as elemental halogen and based on total liquid reactor feed and preferably to less than 10 p.p.m. When adding halogen to maintain the catalyst's halide content, it is advantageous to practice continuous addition. Usually 3 to 4 p.p.m. halogen in the total liquid reactor feed will accomplish the desired catalyst halide level retention. If discontinuous halogen addition is practiced it is desirable to make the addition periods sufficiently frequent that in excess of 10 p.p.m. halogen, based on liquid reactor feed, does not have to be employed. Non-maintenance of the halide content of the catalyst leads to non-selective reaction and contributes to short cycle operation having lower value from an economic standpoint.

While it is not necessary to add sulfur or halogen during the reaction, it is advantageous to add one of them and we especially prefer to add both since this results in maximum onstream periods or throughputs.

Our invention is applicable to the hydrocracking of any distillate feed which is composed predominantly of liquid hydrocarbons boiling below 800° F. and generally between about 350° F. and 800° F. at hydrocracking temperatures ranging generally from about 400° to 800° F. but more suitably from about 450° F. to 750° F. The feed stocks will be substantially free of asphaltic materials in view of the fact that they are obtained by distillation. Subsequent contamination of feeds with asphaltic material is undesirable. The feed stock may be of straight-run or cracked origin. These feeds should contain no more than 25 p.p.m. nitrogenous materials determined as nitrogen. It is preferred to use feeds containing less than 5 p.p.m. nitrogenous material when hydrogen partial pressures below about 1500 p.s.i. are used. If feeds contain in excess of these amounts they should be pretreated in some suitable fashion as for example hydrogenation to effect nitrogen reduction. The products of our hydrocracking process are iso-butane and other isohydrocarbons, high octane gasoline, reforming feed of high quality, high grade jet fuel and furnace oil, etc. as produced in the prior art. After separation of desired products, the higher boiling components can be recycled if desired.

It is preferable for economic reasons to use as low a pressure as possible consistent with long cycle length. Usually about a three-months' cycle length before initial catalyst regeneration is the minimum which will provide an economic process so far as ultimate catalyst life and other process features are concerned. When operating according to the process of this invention, this is easily obtainable with all feeds whether of cracked or straight-run origin at the relatively high hydrogen partial pressures of 1500 to 3000 p.s.i. even though all process conditions are not optimum. If, however, process conditions and procedures are as described herein, this minimum desirable cycle length can be obtained at hydrogen partial pressures of between about 400 to 1500 p.s.i. Thus a hydrogen partial pressure of about 1000 p.s.i. is adequate for the processing of a cracked stock such as a 450 to 650° F. boiling range hydrogen refined catalytically cracked furnace oil distillate, whereas, a hydrogen partial pressure in the range of 400 to 600 p.s.i is adequate when treating a hydrogen refined 350° to 550° F. light straight-run furnace oil distillate, as more fully described below. Our invention therefore includes all such operations at pressures between about 400 p.s.i. and 3000 p.s.i. or higher pressures.

Initially a relatively low temperature will give a conversion of between about 55 and 80 percent and the temperature is gradually increased to maintain this conversion. When a point is reached where an excessive rate of temperature increase is necessary to maintain desired conversion such as at 55 to 80 percent or when a maximum temperature of about 800° F. or preferably about 750° F. is reached, the operation is terminated. The catalyst is regenerated by combustion in the usual manner and thereafter reused in the process. The deposition of coke and/or low product yield due to low catalyst activity usually are the factors which require termination of the operation. A space velocity (liquid volumes of total liquid feed including recycle liquid, if any, per volume of catalyst per hour) of between about 0.5 and 5 and preferably between about 0.75 and 2 may be used for start-up and/or the onstream reaction. A hydrogen (i.e. actual hydrogen content) rate of between about 4,000 and 25,000 s.c.f./bbl. of feed and preferably between 7,000 and 18,000 s.c.f./bbl. of feed may be employed in the hydrocracking process.

At equilibrium in recycle operation, some of the halogen and sulfur which are added and some of the ammonia derived from the feed are dissolved in the product. Also these materials are partly removed via the hydrogen bleed stream. Therefore they usually do not have to be scrubbed out of the hydrogen-rich recycle stream unless the ammonia content of this stream becomes excessively high. The advantage of not scrubbing is of course a reduction in the amount of halogen and sulfur that needs to be added to the liquid hydrocarbon feed by the amount present in the hydrogen recycle. Also of course the cost of scrubbing equipment and operation thereof is avoided.

EXAMPLE I

To illustrate the general aspects of our invention, a hydrogen refined FCC furnace oil, having the properties given in Table I, column A, fortified to 2600 p.p.m. sulfur with dimethyl disulfide, and recycle as soon as it became available together with 10,000 SCF of 75 percent hydrogen/bbl. of feed were passed over a pelleted 6 percent nickel–19 percent tungsten– 2 percent fluorine on "Triple A" silica-alumina catalyst at 1.0 LHSV and 1500 p.s.i.g. (hydrogen partial pressure of about 1050 p.s.i.). The temperature initially was below 450° F. and it was subsequently increased gradually to obtain the desired 69–70 percent conversion of the fresh feed plus recycle and increased thereafter as required to maintain this conversion. Recycling was to extinction of the furnace oil feed. At equilibrium, counting the sulfur returned to the recator as hydrogen sulfide in the unscrubbed recycle gas, the total reactor sulfur base on total liquid feed amounted to about 0.79 percent. After 12 days' operation, during which time the catalyst would have attained its lined-out sulfided condition and the reaction temperature had been increased to 619° F., the product yield and quality obtained are shown in Table II, column A.

Having described the general aspects of our invention, we will now describe a specific especially advantageous application of our invention, i.e. a moderate pressure operation. Although many publications indicate that hydrocracking procedures are applicable to relatively moderate pressure conditions, it is significant that all commercial hydrocracking plants are designed for operating at pressures well above 1000 p.s.i. (See for example the Oil and Gas Journal, June 11, 1962, page 148.) Since high pressure equipment is costly and the cost increases greatly with increasing pressure, there is a real need for a hydrocracking process which will operate satisfactorily in moderate pressure equipment, i.e. that which is designed for pressures of about 800 p.s.i. absolute or below. By employing the expedients described above and in particular by employing both the sulfur addition and halogen addition expedients, we have found that it is entirely feasible to operate a hydrocracking process with certain feed stocks under moderate pressure conditions. This is true even though the operation employs reformer hydrogen as makeup gas for the hydrocracking step. Reformer hydrogen normally contains only about 65 to 85 percent hydrogen. Furthermore, the makeup plus recycle hydrogen used in the hydrocracking operation is consumed while the diluent gases are not and this further lowers the concentration of hydrogen. Therefore the amount of hydrogen actually in the hydrocracking reactor may be quite dilute, such as in the range of between about 60–80 percent. This means that equipment designed for maximum pressures of about 800 p.s.i. actually normally utilizes hydrogen partial pressures of only about 400 to 600 p.s.i.

We have found in accordance with this particular aspect of our invention that a straight-run feed (which includes unconverted recycle from processing of straight-run feed) may be economically converted into high yields of gasoline having a high octane number under moderate pressure conditions and using relatively low hydrogen partial pressures. Careful selection of the feed stock for this moderate pressure operation is required. It is necessary that it be a straight-run feed. It is also necessary that it have a boiling point between about 350 and 550° F. and that it contain no more than about 25 percent aromatics. Higher boiling point feeds or higher aromatic contents result in more rapid loss of activity during the onstream period and therefore require more frequent regenerations. The feed stock must also be low in nitrogen content. This low nitrogen content, i.e. below about 10 p.p.m. and preferably below about 5 p.p.m., may be obtained by selection of straight-run feeds having this low nitrogen content or by pretreating, for instance, by hydrogenation to convert the nitrogenous compounds into ammonia, which then may be removed. Any other of the various known methods for removing nitrogen compounds may be employed.

In this moderate pressure operation it is necessary to introduce sulfur into the hydrocracking reactor in amounts between about 40 p.p.m. and 1.5 percent (determined as sulfur and based on the total liquid feed). We prefer to introduce between 40 p.p.m. and 1000 p.p.m. sulfur during lined-out operation. If these amounts of sulfur are not employed, the catalyst will not exhibit its full activity and will become relatively rapidly deactivated. The sulfur may be added in any desired manner. Thus sulfur compounds naturally present in the fresh feed are entirely satisfactory. However, it will be evident that if the feed contains nitrogen in amounts greater than 10 p.p.m., these sulfur compounds ordinarily will be substantially removed by the pretreatment employed for nitrogen removal. Any of the sulfur compounds described above in connection with the general aspects of our invention may be employed for adding sulfur in this moderate pressure operation. It will be appreciated that the above mentioned amounts of sulfur will include the sulfur present in the hydrogen recycle, makeup hydrogen, feed stock and liquid recycle. Discontinuous or continuous addition of sulfur is satisfactory but continuous addition is preferred.

It is also necessary, in accordance with our moderate pressure operation to employ a catalyst which contains combined halogen, preferably fluorine, in an amount above about 0.1 percent and preferably between 0.5 and 3.5 percent and especially between 1.5 and 2.5 percent. It is also necessary to add a halogen to the reactor during moderate pressure hydrocracking to maintain the combined halogen content of the catalyst and give other beneficial effects such as reducing catalyst aging. The halogen is added during the reaction in the manner and amounts described above in connection with the general aspects of our invention. While fluorine is preferred other halogens can be used as described above.

The nickel-tungsten-silica-alumina catalyst employed in accordance with this aspect of our invention may be prepared as described in the general portion of this application. The catalyst carrier must, however, have a surface area of at least 450 and preferably of at least 500 square meters per gram and a cracking activity index of at least 45.

As indicated, the hydrogen partial pressure in this moderate pressure operation is maintained between about 400 and 600 p.s.i. Of course, a partial pressure substantially above 600 will give good results, but as indicated above such partial pressures require more expensive equipment and are otherwise more costly and therefore are not included within the scope of this moderate pressure aspect of our invention. Hydrogen partial pressures below about 400 p.s.i. give inadequate onstream periods due to rapid loss of activity of the catalyst. Also the yield of gasoline is greatly reduced. The hydrogen (total hydrogen content) is fed to the reactor in an amount of at least 4000 and preferably between 7000 and 18,000 s.c.f./bbl. of feed. It is entirely satisfactory to employ hydrogen derived from reforming processes and to recycle the hydrogen from the hydrocracking process so long as the hydrogen partial pressures are within the range indicated. It will be understood, of course, that with relatively pure hydrogen, it will be entirely feasible to employ absolute pressures in the reactor considerably below 800 p.s.i. Thus with relatively pure hydrogen the reactor may be designed for an absolute pressure in the neighborhood of 400 and 600 p.s.i. On the other hand, with relatively impure hydrogen such as with hydrogen purities of between about 60 and 80 percent, a hydrogen partial pressure of 400 to 600 p.s.i. and an absolute pressure in the neighborhood of 800 p.s.i. will be used.

This moderate pressure hydrocracking reaction is carried out at a temperature between about 400 and 750° F. It is advantageous after the initial high activity edge has been taken off the catalyst to increase the temperature so that about 55 to 80 percent conversion takes place. The temperature thereafter is increased at a rate sufficient to maintain conversion between 55 and 80 percent. When the temperature has thus been increased to about 750° F. the operation is terminated and the catalyst is regenerated by combustion in the usual fashion. The regenerated catalyst is then re-used in the process. This hydrocracking process may be carried out employing space velocities (liquid volume of total liquid feed including recycle liquid, if any, per volume of catalyst per hour) of between about 0.75 and 2.0.

Although a presulfided catalyst may be employed in this aspect of our invention, we prefer to initially utilize a reduced, partially reduced, or more preferably an oxide catalyst and start the reaction up in the manner described in the above mentioned co-filed application.

It is well known that hydrocracking catalysts are sensitive to poisoning by nitrogen, and it is for this reason that the feed stocks should be low in nitrogen content as pointed out above. Where the feed stock contains amounts of nitrogen between about 5 and 10 p.p.m., it is advisable to provide for scrubbing of recycle hydrogen. Otherwise the nitrogen compounds in the feed will be hydrogenated to ammonia and this ammonia will be recycled to the hydrocracking operation, thus increasing in many cases nitrogen content above the permissible limits. A particularly advantageous aspect of our invention in both high and low pressure operations is the utilization of feed stocks which contain less than about 5 p.p.m. of nitrogen and recycling the hydrogen without removal of nitrogen compounds therefrom. In other words, we have found that it is entirely feasible to operate all of the aspects of our invention described above without scrubbing of the hydrogen recycle gases to remove ammonia if the feed stock contains less than about 5 p.p.m. of nitrogen compounds. Of course, some of the recycle hydrogen is bled off from the system in order to maintain hydrogen concentration, and this hydrogen bleeding, along with some solution of ammonia in the reaction product, will simultaneously maintain the nitrogen content within required limits.

EXAMPLE II

The following example of hydrocracking a light straight-run furnace oil demonstrates the application of our process at moderate pressures. The hydrogen refined furnace oil charged for the first 10 days had the properties given in Table I, column B. Thereafter, the hydrogen refined charge used had the properties given in Table I, column C. In the initial operation the charge fortified to 1662 p.p.pm. sulfur with dimethyl disulfide and unconverted feed recycle after about three days, together with 18,000 s.c.f. of 75 percent hydrogen/bbl., was passed over a pelleted 6 percent nickel-19 percent tungsten-2 percent fluorine on "Triple A" silica-alumina catalyst initially in the oxide form at 0.94 LHSV and 750 p.s.i.g. (550 hydrogen partial pressure). The start-up temperature was above the dew point of the reaction mixture at conditions existing in the reactor but below 425° F. Thereafter, the temperature was increased to obtain a conversion of about 67 percent of fresh feed plus recycle and the operation comprised recycling to obtain complete conversion of the charge. After four days the amount of sulfur added was decreased and adjusted as required to give a total fresh feed sulphur content of 54 p.p.m. both with the initial feed and the new feed employed after 10 days. At equilibrium this amount and that returning as hydrogen sulfide in the recycle gas scrubbed to remove ammonia but not hydrogen sulfide gave a total reactor sulfur level of about 270 p.p.m. based on total liquid reactor feed. For the first 19 days of operation, 10 p.p.m. fluorine as ortho-fluorotoluene was added to the fresh feed. Thereafter the amout of flourine was cut to 4 p.p.m. based on fresh feed and the source of sulfur added to the fresh feed was changed from dimethyl disulfide to carbon disulfide which has been found to be the equivalent of dimethyl disulfide so far as effecting the operation is concerned. After 20½ days, during which time the catalyst would have obtained its lined-out sulfided condition, the product yield and quality obtained are shown in Table II, column B. It will be noted that the light gasoline was of excellent quality. Furthermore, it was established that the naphtha was an excellent reforming charge stock. Starting after 23½ days processing time, for two days the recycle gas was not scrubbed to remove ammonia. The 2.2 p.p.m. N stock, described in column C, Table I, being used generated enough ammonia to reduce the activity of the catalyst enough to necessitate increasing the reaction temperature, 18° F., to maintain the 67 percent conversion but almost all the activity loss was immediate and further aging was quite slow. Furthermore, there was an almost complete activity restoration upon resumption of scrubbing after two days. The operation was continued with minor modifications for three months. At that time the reaction temperature to maintain 67 percent conversion was only 660° F. and the catalyst aging rate was very low, indicating that several more weeks of operation could be obtained before catalyst regeneration would be required.

*Table I*

|  | A | B | C |
|---|---|---|---|
| Gravity, ° API | 28.4 | 42.4 | 41.5 |
| Nitrogen, p.p.m. | 1.0 | 4.7 | 2.2 |
| Sulfur, p.p.m. | 5 | 17 | 3 |
| Hydrocarbon type, vol. percent: |  |  |  |
| Saturates | 42.1 | 81.7 | 81.1 |
| Aromatics | 55.2 | 16.3 | 16.5 |
| Olefins | 2.7 | 2.0 | 2.4 |
| Distillation, ° F.: |  |  |  |
| Over Point | 406 | 375 | 389 |
| End Point | 612 | 537 | 549 |
| 10% | 440 | 407 | 415 |
| 50% | 494 | 432 | 436 |
| 90% | 570 | 472 | 480 |

*Table II*

|  | A | B |
|---|---|---|
| Product yields, vol. percent of fresh feed [a]: |  |  |
| Propane | 4.3 | 4.7 |
| Butanes | 15.3 | 19.7 |
| Light gasoline ($C_5$ and $C_6$) | 26.7 | 28.5 |
| Naphtha ($C_7$ to 390° F. end point) | 79.0 | 65.5 |
| Light gasoline octane numbers: |  |  |
| Motor, clear | 83.5 | 81.6 |
| Motor, +3 cc. TEL | 99.2 | 99.0 |
| Research, clear | 85.5 | 84.0 |
| Research, +3 cc | 98.5 | 97.7 |
| Naphtha properties: |  |  |
| Composition, vol. percent: |  |  |
| Paraffins | 28.8 | 44.8 |
| Naphthenes | 48.7 | 42.2 |
| Aromatics | 22.5 | 13.0 |
| Octane Numbers: |  |  |
| Motor, clear | 67.9 | 58.3 |
| Motor, +3 cc | 83.0 | 78.9 |
| Research, clear | 72.2 | 58.4 |
| Research, +3 cc | 87.7 | 78.9 |

[a] Methane and ethane formation was less than 1 wt. percent of fresh feed.

We claim:
1. A hydrocracking process providing extended catalyst life which comprises subjecting a feed which is predominantly composed of hydrocarbons boiling in the range between about 350° and 800° F. and which is substantially free of asphaltic material and which contains less than about 25 p.p.m. nitrogen to treatment with hydrogen at a temperature between about 400° and 800° F. at a pressure above about 400 p.s.i. while in the presence of a nickel-tungsten sulfide catalyst composited with a siliceous carrier having an activity index greater than 40, said composite containing above about 0.1 percent combined halogen.

2. A hydrocracking process providing extended catalyst life which comprises subjecting a feed which is predominantly composed of hydrocarbons boiling in the range between about 350° and 800° F. which is substantially free of asphaltic materials and which contains less than about 25 p.p.m. nitrogen to treatment with hydrogen at a temperature between about 400° and 750°F. at a pressure between about 400 and 3000 p.s.i. while in the presence of a nickel-tungsten sulfide catalyst composited with a silica-alumina carrier having an activity index greater than 40, said composite containing above about 0.1 percent combined halogen, and adding halogen during the treatment.

3. A hydrocracking process providing extended catalyst life which comprises subjecting a feed which is predominantly composed of hydrocarbons boiling in the range between about 350° and 800° F. which is substantially free of asphaltic materials and which contains less than about 25 p.p.m. nitrogen to treatment with hydrogen at a temperature between about 400° and 750° F. at a pressure between about 400 and 3000 p.s.i. while in the presence of a nickel-tungsten sulfide catalyst composited with a silica-alumina carrier having an activity index greater than 40, said composite containing above about 0.1 percent combined halogen, and adding sulfur during the treatment.

4. A hydrocracking process providing extended catalyst life which comprises subjecting a feed which is predominantly composed of hydrocarbons boiling in the range between about 350° and 800° F. which is substantially free of asphaltic materials and which contains less than about 25 p.p.m. nitrogen to treatment with hydrogen at a temperature between about 400° and 750° F. at a pressure between about 400 and 3000 p.s.i. while in the presence of a nickel-tungsten sulfide catalyst composited with a silica-alumina carrier having an activity index greater than 40, said composite containing above about 0.1 percent combined halogen, and adding sulfur and a halogen during the treatment.

5. A hydrocracking process providing extended catalyst life which comprises subjecting a feed which is predominantly composed of hydrocarbons boiling in the range between about 350° and 800° F. which is substantially free of asphaltic materials and which contains less than about 5 p.p.m. nitrogen to treatment with hydrogen at a temperature between about 400° and 750° F. at a pressure above about 800 p.s.i. while in the presence of a nickel-tungsten sulfide catalyst composited with a siliceous carrier having an activity index greater than 40, said composite containing above about 0.1 percent combined halogen, separating hydrogen from the hydrocracked product, recycling a portion of the separated hydrogen without removal of ammonia therefrom and bleeding off the portion of the separated hydrogen which is not recycled.

6. A hydrocracking process providing extended catalyst life which comprises subjecting a feed which is predominantly composed of hydrocarbons boiling in the range between about 350° and 800° F., which is substantially free of asphaltic materials, which contains less than about 25 p.p.m. nitrogen to treatment with hydrogen at a pressure between about 400 and 3000 p.s.i. at a temperature between about 400° and 800° F., while in the presence of a nickel-tungsten sulfide catalyst deposited upon a silica-alumina carrier, which carrier has an activity index greater than about 40 and a surface area greater than about 450 square meters per gram and simultaneously introducing into contact with said catalyst between about 400 p.p.m. and 1.5 percent of sulfur and between about 1 and 20 p.p.m. of a halogen based on liquid reactor feed; whereby at least about 0.1 percent by weight based on the total catalyst of halogen is combined with the catalyst.

7. A hydrocracking process providing extended catalyst life which comprises subjecting a feed which is predominantly composed of hydrocarbons boiling in the range between about 350° and 550° F., which is substantially free of asphaltic materials which contain below about 25 percent aromatic hydrocarbons and which contains less than about 5 p.p.m. nitrogen to treatment with 60 to 80 percent hydrogen at an absolute pressure below about 800 p.s.i. at a temperature between about 400° and 750° F., at a hydrogen partial pressure between about 400 and 600 p.s.i. while in the presence of a nickel-tungsten sulfide catalyst deposited upon a silica-alumina carrier, which carrier has an activity index greater than about 45 and a surface area greater than about 500 square meters per gram, said composited catalyst containing between about 0.5 and 3.5 percent combined halogen, and simultaneously introducing into contact with said catalyst between about 40 and 1000 p.p.m. of sulfur and between about 1 and 10 p.p.m. fluorine based on liquid reactor feed.

8. A hydrocracking process providing extended catalyst life which comprises subjecting a feed which is predominantly composed of hydrocarbons boiling in the range between about 350° and 550° F., which is substantially free of asphaltic materials which contains below about 25 percent aromatic hydrocarbons and which contains less than about 10 p.p.m. nitrogen to treatment with hydrogen at an absolute pressure below about 800 p.s.i. at a temperature between about 400° and 750° F., at a hydrogen partial pressure between about 400 and 600 p.s.i. while in the presence of a nickel-tungsten sulfide catalyst deposited upon a silica-alumina carrier, which carrier has an activity index greater than about 45 and a surface area greater than about 500 square meters per gram, said composited catalyst containing above about 0.1 percent combined halogen and simultaneously introducing into contact with said catalyst between about 40 and 1000 p.p.m. of sulfur and between about 1 and 10 p.p.m. of halogen based on liquid reactor feed, increasing the temperature to maintain conversion at between about 55 and 80 percent, terminating the process before a temperature of about 750° F. is reached, regenerating the catalyst and repeating the process with the regenerated catalyst.

9. A hydrocracking process providing extended catalyst life which comprises subjecting a feed which is predominantly composed of hydrocarbons boiling in the range between about 350° and 550° F., which is substantially free of asphaltic materials which contains below about 25 percent aromatic hydrocarbons and which contains less than about 5 p.p.m. nitrogen to treatment with hydrogen at an absolute pressure below about 800 p.s.i. at a temperature between about 400° and 750° F., at a hydrogen partial pressure between about 400 and 600 p.s.i. while in the presence of a nickel-tungsten sulfide catalyst deposited upon a silica-alumina carrier, which carrier has an activity index greater than about 45 and a surface area greater than about 500 square meters per gram, said composited catalyst containing above about 0.1 percent combined fluorine and simultaneously introducing into contact with said catalyst between about 40 and 1000 p.p.m. of sulfur and between about 1 and 10 p.p.m. of fluorine, based on liquid reactor feed, separating hydrogen from the hydrocracked product, recycling a portion of the separated hydrogen without removal of ammonia herefrom, bleeding off the portion of the separated hydrogen which is not recycled, increasing the temperature to maintain conversion at between about 55 and 80 percent, terminating the process before a temperature of about 750° F. is reached, regenerating the catalyst and repeating the process with the regenerated catalyst.

References Cited by the Examiner
UNITED STATES PATENTS

| | | | |
|---|---|---|---|
| 1,983,434 | 12/1934 | Krauch et al. | 208—108 |
| 2,154,527 | 4/1939 | Pier et al. | 208—109 |
| 2,642,384 | 6/1953 | Cox | 208—139 |
| 2,934,492 | 4/1960 | Hemminger et al. | 208—112 |
| 2,944,005 | 7/1960 | Scott | 208—109 |
| 3,008,895 | 11/1961 | Hansford et al. | 208—112 |
| 3,078,238 | 2/1963 | Beuther et al. | 208—109 |
| 3,099,617 | 7/1963 | Tulleners | 208—107 |
| 3,153,627 | 10/1964 | Beuther et al. | 208—111 |

DELBERT E. GANTZ, *Primary Examiner.*
ALPHONSO D. SULLIVAN, *Examiner.*
A. RIMENS, *Assistant Examiner.*

UNITED STATES PATENT OFFICE
CERTIFICATE OF CORRECTION

Patent No. 3,269,936                         August 30, 1966

Richard G. Goldthwait et al.

It is hereby certified that error appears in the above numbered patent requiring correction and that the said Letters Patent should read as corrected below.

Column 1, line 34, for "out" read -- our --; column 7, line 34, for "p.p.pm." read -- p.p.m. --; line 48, for "sulphur" read -- sulfur --; line 56, for "flourine" read -- fluorine --; column 9, line 47, for "400 p.p.m." read -- 40 p.p.m. --; same line 47, for "perecnt" read -- percent --; column 10, line 46, for "herefrom" read -- therefrom --.

Signed and sealed this 26th day of September 1967.

(SEAL)
Attest:

ERNEST W. SWIDER                         EDWARD J. BRENNER
Attesting Officer                      Commissioner of Patents